United States Patent Office 2,750,418
Patented June 12, 1956

2,750,418

PRODUCTION OF UNSATURATED 1,4-DICARBONYL COMPOUNDS

Niels Konrad Friedrich Wilhelm Clauson-Kaas, Klampenborg, Denmark, assignor to Kemisk Vaerk Koge A/S, Copenhagen, Denmark, a firm No Drawing. Application February 26, 1951, Serial No. 212,828

Claims priority, application Sweden April 30, 1947

4 Claims. (Cl. 260—601)

The present invention relates to the production of unsaturated 1,4-dicarbonyl compounds of the general formula:

$$R_1-\overset{O}{\underset{\|}{C}}-CH=CH-\overset{O}{\underset{\|}{C}}-R_2$$

where $R_1$ and $R_2$ signify hydrogen, alkyl or saturated aliphatic groups containing only carbon, hydrogen and oxygen.

The application is a continuation in part as to all common subject matter of my copending application, S. N. 22,924, filed on April 23, 1948, now abandoned.

Unsaturated 1,4-dicarbonyl compounds, as represented by for instance malealdehyde, are very reactive compounds and may be used in various syntheses, e. g. in the production of pyridazines, carotinoids and tropinone derivatives.

In a recently disclosed method 1,4-dicarbonyl compounds are produced by hydrolyzing 2,5-dialkoxy-2,5-dihydrofurans under acid conditions. However, the hydrolysis of these compounds proceeds only to a certain equilibrium, dependent on the amount of water which is used. The said dihydrofurans thus apparently behave like ordinary acetals, so that each of a number of different acetals, semi-acetals and hydrates of the unsaturated 1,4-dicarbonyl compounds exist in appreciable amounts in equilibrium with each other in the hydrolysate.

It is an object of my invention to provide for a new method by which unsaturated 1,4-dicarbonyl compounds are produced in a pure state and in high yield.

I have found that this object can be achieved by hydrolyzing the 2,5-diacyloxy-2,5-dihydrofurans described in my U. S. Patent No. 2,514,026 with the equivalent amount of water in the presence of a trace of a strong mineral acid.

The hydrolysis, which may be illustrated by the following scheme of reaction:

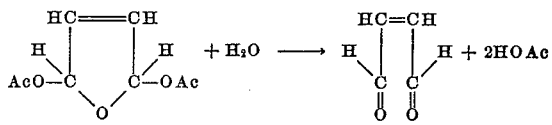

where Ac signifies acyl, seems to be irreversible and also more rapid than the hydrolysis of the 2,5-dialkoxy-2,5-dihydrofurans.

It should be noted that it could not be foreseen that the said compounds could be hydrolysed as above, since it is known that nitroacetins may split off acetic acid when boiled with water to form nitrofurans according to the following scheme of reaction:

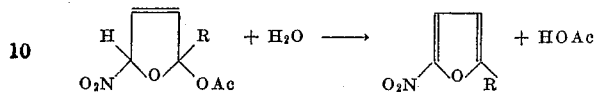

In the same way the 2,5-diacyloxy-2,5-dihydrofurans might have yielded 2-acetoxyfurans instead of unsaturated 1,4-dicarbonyl compounds.

My new method is further advantageous in that, because of the irreversibility of the hydrolysis, it is possible to prepare anhydrous solutions of the unsaturated 1,4-dicarbonyl compounds in organic solvents in a simple manner, viz. by using equivalent amounts of water and the 2,5-diacyloxy-2,5-dihydrofuran.

To demonstrate the different behaviour of the diacetoxy and dimethoxy compounds, I have made a number of comparative hydrolyses the result of which are given in the following table:

*Hydrolysis of 2,5-diacetoxy-2,5-dihydrofuran and 2,5-dimethoxy-2,5-dihydrofuran at room temperature*

| Dihydrofuran | Hydrolyzing agent | Approximate ratio dihydrofuran to hydrolyzing agent | Reaction period and yield | | | Product used for determining the yield |
|---|---|---|---|---|---|---|
| Diacetoxy | N/10 $H_2SO_4$ | 1:4 | 1 hour, 77% | | | Malealdehyde bisphenylhydrazone. |
| Dimethoxy | N/10 $H_2SO_4$ | 1:20 | 19 hours, 76% | | | Do. |
| Do | N/10 $H_2SO_4$ | 1:2 | 1 hour, 52% | 6 hours, 59% | 25 hours, 60% | Do. |

It appears from these experiments that the diacetoxy compound reacts much faster than the dimethoxy compound, and that the yield of malealdehyde is higher when hydrolyzing the former than when hydrolyzing the latter if moderate quantities of water are present.

The following examples, submitted in illustration of my present invention, are not to be taken as in any way limiting the scope thereof.

Example 1

2,5-diacetoxy-2,5-dihydrofuran is boiled for 45 seconds with 15 parts of centinormal sulfuric acid. The liquid turns yellow due to the malealdehyde formed. The malealdehyde is identified by addition of phenylhydrazine, whereby malealdehyde bisphenylhydrazone (m. p. 170° C.) is precipitated.

Example 2

93.0 gms. of 2,5-diacetoxy-2,5-dihydrofuran are added to 400 ccs. of N/10 aqueous sulfuric acid at room temperature and the mixture stirred efficiently. After 1 hour the malealdehyde formed is determined by converting it to pyridazine in known manner. The yield corresponds to 85% of the theoretical.

I claim:

1. The method of producing an unsaturated 1,4-dicarbonyl compound comprising the hydrolyzation of 2,5-diacyloxy-2,5-dihydrofuran in aqueous medium.

2. The method of producing malealdehyde comprising the hydrolyzation of 2,5-diacetoxy-2,5-dihydrofuran in aqueous medium.

3. The method of claim 1 in which the medium contains a dilute mineral acid.

4. The method of claim 2 in which the medium contains a dilute mineral acid.

References Cited in the file of this patent

UNITED STATES PATENTS

| | | |
|---|---|---|
| 2,514,026 | Clauson-Kaas | July 4, 1950 |
| 2,515,304 | Jones | July 18, 1950 |

FOREIGN PATENTS

| | | |
|---|---|---|
| 965,571 | France | Feb. 22, 1950 |

OTHER REFERENCES

Marquis: "Ann. Chim. et Phys.," Series 8, vol. 4 (1905) pp. 220–24.

Freure et al.: "Jour. Am. Chem. Soc.," vol. 53 (1931), pp. 1142–47.

Clauson-Kaas: Acta Chem. Scand., 1, page 380 (1947).